(12) United States Patent
Tzannes et al.

(10) Patent No.: US 9,820,215 B2
(45) Date of Patent: *Nov. 14, 2017

(54) METHOD AND DEVICE TO PROHIBIT COMMUNICATIONS WHICH REQUIRE ACTIVE PARTICIPATION BY THE DRIVER OF A VEHICLE

(71) Applicants: Jason Tzannes, Lexington, MA (US); Ryan Wittman, Centreville, VA (US)

(72) Inventors: Jason Tzannes, Lexington, MA (US); Ryan Wittman, Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,994

(22) Filed: Dec. 5, 2016

(65) Prior Publication Data
US 2017/0086129 A1   Mar. 23, 2017

Related U.S. Application Data

(63) Continuation of application No. 14/746,331, filed on Jun. 22, 2015, now Pat. No. 9,516,529.

(60) Provisional application No. 62/015,050, filed on Jun. 20, 2014.

(51) Int. Cl.
| | |
|---|---|
| *H04B 5/00* | (2006.01) |
| *H04W 48/04* | (2009.01) |
| *H04W 4/00* | (2009.01) |
| *H04W 76/02* | (2009.01) |
| *H04W 24/08* | (2009.01) |
| *H04B 5/02* | (2006.01) |

(Continued)

(52) U.S. Cl.
CPC ............. *H04W 48/04* (2013.01); *H04B 5/02* (2013.01); *H04M 1/64* (2013.01); *H04M 1/72552* (2013.01); *H04M 1/72577* (2013.01); *H04W 4/008* (2013.01); *H04W 4/046* (2013.01); *H04W 4/14* (2013.01); *H04W 24/08* (2013.01); *H04W 76/023* (2013.01); *H04W 84/12* (2013.01); *H04W 84/18* (2013.01); *H04W 88/02* (2013.01)

(58) Field of Classification Search
CPC ... H04W 24/08; H04W 4/008; H04W 76/023; H04W 84/18; H04M 1/64; H04M 1/72552; H04B 5/02
See application file for complete search history.

(56) References Cited

U.S. PATENT DOCUMENTS 8,275,395 B2    9/2012  Howarter et al.
9,516,529 B2 *  12/2016 Tzannes ................. H04M 1/64
(Continued)

OTHER PUBLICATIONS

Screen shot of Connect2Car webpage available at www.connect2car.com, Aug. 25, 2014.
(Continued)

*Primary Examiner* — Nguyen Vo
(74) *Attorney, Agent, or Firm* — Jason H. Vick; Sheridan Ross, PC

(57) ABSTRACT

Operating a vehicle while texting, using applications or using a mobile device has been shown to be very dangerous and increase the likelihood of accidents. An exemplary embodiment relates to a method, techniques and a system that can prohibit the use of a mobile device by the driver while driving. An exemplary embodiment relates to the fields of communications and control and combines the use of social media and smartphones to create methods to prohibit the use of specific communications on the mobile device including but not limited to texting, etc.

20 Claims, 5 Drawing Sheets

(51) Int. Cl.
*H04M 1/64* (2006.01)
*H04M 1/725* (2006.01)
*H04W 4/04* (2009.01)
*H04W 4/14* (2009.01)
H04W 84/18 (2009.01)
H04W 84/12 (2009.01)
H04W 88/02 (2009.01)

(56) References Cited

U.S. PATENT DOCUMENTS

| | | |
|---|---|---|
| 2011/0130132 A1 | 6/2011 | Lipovski |
| 2012/0253552 A1 | 10/2012 | Skelton |
| 2012/0268235 A1* | 10/2012 | Farhan ............... G05B 23/0278 340/3.1 |
| 2012/0329444 A1 | 12/2012 | Osann, Jr. |
| 2013/0217331 A1* | 8/2013 | Manente ............... H04W 4/008 455/41.2 |
| 2015/0148018 A1 | 5/2015 | Rose et al. |
| 2015/0237195 A1 | 8/2015 | Jones et al. |

OTHER PUBLICATIONS

Restriction Requirement for U.S. Appl. No. 14/746,331, dated Jun. 2, 2016.
Notice of Allowance for U.S. Appl. No. 14/746,331, dated Aug. 25, 2016.

* cited by examiner

METHOD AND DEVICE TO PROHIBIT COMMUNICATIONS WHICH REQUIRE ACTIVE PARTICIPATION BY THE DRIVER OF A VEHICLE

CROSS-REFERENCE TO RELATED APPLICATIONS

This application is a Continuation of U.S. patent application Ser. No. 14/746,331, filed Jun. 22, 2015, now U.S. Pat. No. 9,516,529, which claims the benefit of and priority under 35 U.S.C. §119(e) to U.S. Patent Application No. 62/015,050 filed Jun. 20, 2014, entitled "Method and Device to Prohibit Texting While Operating a Vehicle", the entirety of which is incorporated herein by reference.

FIELD OF THE INVENTION

Operating a vehicle while texting, using applications or using a mobile device has been shown to be very dangerous and increase the likelihood of accidents. An exemplary embodiment relates to a method, techniques and a system that can prohibit the use of a mobile device by the driver while driving. An exemplary embodiment relates to the fields of communications and control and combines the use of social media and smartphones to create methods to prohibit the use of specific communications on the mobile device including but not limited to texting, etc.

BACKGROUND

Mobile Devices Controlling Devices:

Mobile devices are ubiquitous. They are used for voice communications as well as textual communications such as texts, emails and other written communications through social networking sites (such as Facebook®, Twitter®, LinkedIn®), etc. In this disclosure "mobile device" we mean all devices that can communicate via cellular, Wi-Fi, Bluetooth® or other communications and are portable, including but not limited to cell phones, smart phones, tablets, wearables, etc. These devices are used for both communications and entertainment purposes. Mobile devices for the purposes of this disclosure also include wearable devices such as watches or articles of clothing or Fitbit® and other exercise monitoring devices that have connectivity and processing capabilities. In exercise applications, software is used in watches and devices, such as Fitbits®, to keep track of miles walked or run, speed of walking or running, elevation, etc. These devices are also used for other activities such as biking or skiing. A digital watch for example could be used to open the car, and start the engine, etc., or be used to control things other than cars.

Communications include making pa hone call (cellular or using voice over IP, like Skype® or Facetime®), sending/receiving texts, posting to social media sites (such as Facebook® or LinkedIn®), etc. Entertainment includes, for example, listening to music, looking at photos, watching videos or surfing the Internet, or the like—navigation can also generally be included in this entertainment category.

It is important to limit some of these capabilities while driving but not necessarily all. In general, an exemplary embodiment is directed toward limiting any activity that requires active participation from the driver. So, listening to music, which is "passive"—i.e., does not involve participation from the driver (as opposed to "active"—which does require participation from the driver) is ok, in the sense that it doesn't distract a driver as much. Anything involving typing is especially distracting and is considered active. This is why, for example, many GPS systems won't let you input addresses (by typing them in) when you are driving. However GPS can also be passive, after you input the address, and it is important since it is very useful to the driver. So a GPS giving instructions should not be disabled. Voice calls are allowable, since the participation by the driver is speaking only (does not involve typing or even looking at the phone) and therefore he or she can continue to watch the road.

Mobile devices are also becoming increasingly used for automation and control applications, such as for controlling televisions and other electronics (acting as a remote control) or controlling home devices such as lights, air conditioning, opening and closing doors, etc. Mobile devices are also being used to start a car or open the doors or windows in a car remotely. We will refer to the device being controlled (i.e., the TV, other electronic device, car, other vehicle, etc.) as the "control device." In this description, the phone/mobile device can be the "controlling device." Note that the control device may be the entire device that is being controlled and/or a hardware and/or software module that is integrated into the entire device that is capable of controlling the device. For example, a hardware module that connects to the car starter/ignition (either through a wired or wireless connection) is the "control device" for that car for the purposes of starting the car. Mobile phones as controlling devices are becoming more and more popular, since everyone now uses mobile devices that have extensive functionality (in terms of computational capability and flexibility of use through software) and can support additional features easily.

An example of a mobile phone as a controlling device for a car is the following. Mobile devices can be used today to start and control inside features of vehicles before or as an alternative to a real key being present. Note that some auto starters have time limits so that the car automatically turns off if the real key is not presented within a certain time period. This requires a combination of new hardware in today's vehicles that (i) connect the vehicle to the Internet or to a cellular network and (ii) connect to the starter of the vehicle. If one of these devices is installed in the vehicle, a text message can be sent from the mobile device to the vehicle to start the vehicle. This can be done from anywhere, since the mobile device and the vehicle can be connected via the Internet or via a cellular network. So, for example, someone could start their car in NY while on their phone in San Francisco as long as both their car and phone are either on the same cellular network or both connected to the Internet. An example of such a device is sold by Connect2Car (see connect2car.com as of Jun. 14, 2014). This device enables communications with a car either via a cellular link (such as GSM) or via Bluetooth®.

A more elaborate example of the mobile device acting as a controlling device for a car is a solution like the Android Car and Car Play® (by Apple®). With these software solutions, mobile devices control the dashboard of the car via the mobile device. These are software or apps (applications) that effectively turn the control of car functionality over to the mobile device. Car functionality such as music choice and volume, air conditioning, sunroof control, window control, etc. could be all controlled via software such as in a one or more apps.

Mobile devices can also be and are increasingly being used to control things other than cars. The Internet of Things (IoT) is an emerging technology and industry that will allow any "thing" to be connected to and accessed via the internet or other communications networks. Within IoT, mobile devices play a key controlling device role, since they can be used to program, monitor, and receive information from the connected things. For example an app on a phone can be used to monitor a home security camera that is connected to the Internet (the camera is the "thing"). With a typical app, the user can turn the camera on or off, ask the camera to send a recent photo or video, have the mobile phone receive a photo or video if the camera so chooses, etc., i.e., the phone is a controlling device that is being actively used for home security/monitoring.

Cars as Connected Devices

There are an increasing number of communications chips being used in cars today for multiple purposes. For the purposes of this description, a car can be any vehicle, including buses, trains, motorcycles, etc.

Cars are becoming increasingly sophisticated in their level of connectivity to communications networks. Many cars today have cellular connectivity capability (e.g., a cellular transceiver chip that is dedicated to the car) that can then be used for communication to and from the car itself (for safety purposes, for example), for GPS in the car, or as a hotspot for Wi-Fi access for occupants in the car. Many of the "things" in the car are or will become connected as well, such as radios, and even seats or gas tanks. Anything where information would be useful to the car owner or manufacturer can be easily connected via an IoT applications. As an example, a car in an accident can notify a third party (e.g. police, roadside service company, etc.) via a communications link initiated by the car (as opposed to the driver), its location and status. As another example, one could see how much gas is in their tank by looking at their smartphone if the tank had a IoT chip—and could know whether they needs to plan a trip to the gas station before getting in the car and looking at the gas gauge. Seat sensors (via IoT communications) would be used to see how many people are in a car at a certain time, in case of accident to know how many occupants were involved in the incident.

In the near future, cars are going to have Wi-Fi transceivers that are used primarily for safety and control purposes. For the purpose of this invention, we will call these "safety Wi-Fi links". The devices that produce these links will be in each car (and in other locations) and provide a means for cars to communicate with one another to determine proximity to one another or to incidents on the road (accidents, road work, etc.) Safety Wi-Fi links are not used for the occupants to communicate content generated by them, but instead are used by the cars themselves for safety and control reasons. IEEE 802.11p is an example of such a technology, as is LTE direct. Both of these technologies have a reach (i.e., they can communicate within a range) of about 300 meters and allow for cars to "see" things (using radio waves) that cannot be seen with the sensors they often use that are based on line of sight vision (such as cameras installed on bumpers, etc.). Since radio waves can propagate through objects, these wireless signals can "see" things that are beyond the car in front or the object to the car's right or left. It can provide an indication of the presence of another such communications device within an allowed distance and therefore provide a "landscape" of objects that are close to the car. Self-driving cars and auto-stopping are some of the emerging uses of this technology in cars today. In summary, for the purpose of this disclosure, cars are becoming homes for multiple communications chips that are dedicated to the car functionality.

In general, cars can independently connect to other cars or other devices such as mobile devices.

Limiting the Use of Cell Phones in Cars

It is desirable to limit the use of mobile devices in cars for safety reasons. There are laws that outlaw the use of phones for texting, but there effect has been limited. The primary problem is that while most people can't text and drive—they think they can. And therefore approaches that try to convince people otherwise (with advertisements and training classes and driver's education) have met limited success.

SUMMARY

An exemplary embodiment at least provides a method of discouraging and ultimately prohibiting the use of communications that require active participation by a user by disabling other functions that are of use to the driver. The exemplary steps involved include:

A. Determining one or more properties/characteristics of a mobile device to establish that the mobile device is in the hands of a driver or that it is located within a car.

B. Disabling and confirming that a user (typically a driver in our description, but it could be any user) has disabled communications that would require active participation. These communications are typically controlled by the mobile device user and therefore cannot be disabled by anyone but the mobile device user. A typical example of this is texting by a driver on a phone he owns.

In an exemplary embodiment, steps A and B often both occur. However, sometimes B occurs without A, as described below, or A is detected by a third party.

Subsequent to A and/or B, two scenarios exist, called C and D. C and/or D depend upon confirmation that B communications have been disabled.

C. Allowing communications and control functions that involve communications or controls initiated by the car to be enabled only if B has been confirmed. Note that the communications that are disabled are not in the control of the mobile phone user and therefore can be disabled without consent of the user. An example of this is the hotspot availability of Wi-Fi in a car is disabled unless the car confirms that B has occurred.

D. Allowing communications and control functions that involve using the mobile device as a controlling device (either to control the car or to control something else) to be enabled only if B has been confirmed. For example, using a mobile phone to control the dashboard in the car (like in Car Play® by Apple®) is only allowed if B has been confirmed. Another example is that the mobile device cannot be used to control home automation or monitor exercise unless B has been confirmed.

The above steps (A and/or B, then C and/or D) are such that if the driver does not disable communications in B, then functionalities as described for example in C and/or D are disabled. As long as the monitoring A and B can be effectively executed, and as long as example functionality such as that described in C and/or D is willing to be disabled as long as B is not confirmed, this technique will motivate and potentially force the driver to disable communications in B.

BRIEF DESCRIPTION OF THE DRAWINGS

For a more complete understanding of the invention, reference is made to the following description and accompanying drawings, in which.

DETAILED DESCRIPTION

Figure 1:
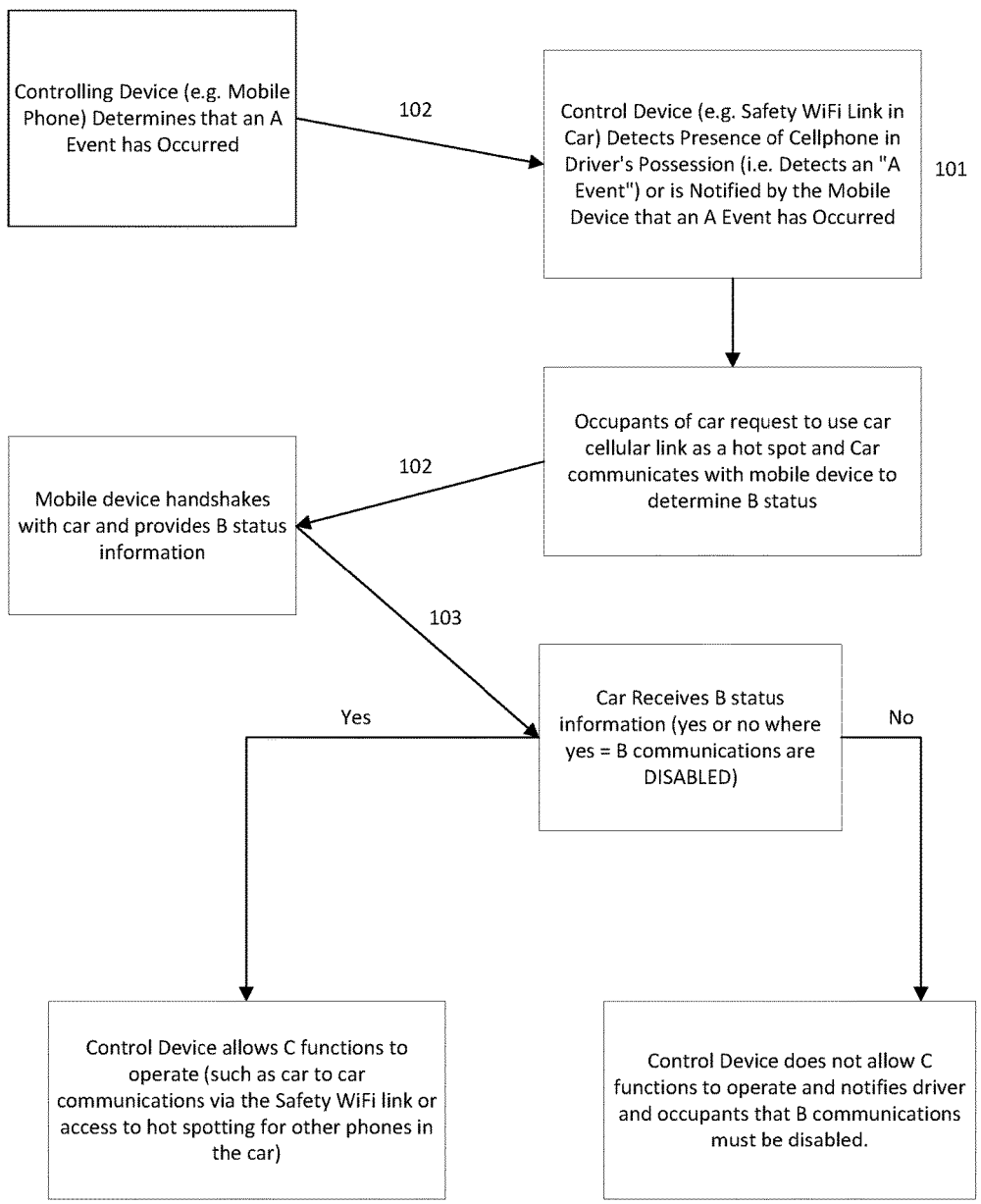
FIG. 1 is an example of a controlling device being allowed or denied access to a control device.

In this section we describe the steps A, B, C and D in more detail.

Exemplary "A properties", i.e., properties/characteristics of a mobile device can include:

- A speed at which a mobile device is traveling. Calculating this speed can be determined by calculating the time between GPS readings, or by using an accelerometer within the mobile device, or in other ways. This can determine that the device is moving, but it may not be in a car necessarily, and it may be in the hands of someone other than the driver.
- The distance from the mobile device and another device in or on the car. Calculating the distance between the mobile device and another known location (e.g., a steering wheel, a seat, a silicon device in a steering wheel or seat or the radio, a cellular chip inside a car, a Wi-Fi chip inside a car, an Internet of Things chip) can be determined from measuring the strength of a signal at one of the devices (given that the transmit power is known, the distance can then be calculated) or by any other means by which the distance can be calculated. For example, by measuring the distance between a GPS chip in the mobile device and a second GPS chip in a known location the car. With distance measurements and location estimations, it is possible to determine whether the mobile device is located in the car and where it is located in the car (and therefore whether it is in driver's hands), but it may not be moving.
- An indication of the presence of another device by the mobile device or an indication of the presence of the mobile device by another device. Detecting the presence of a device with respect to another device can be done in numerous ways. For example, a mobile device could detect that it is in the presence of the IoT in a seat and thus is it determined that the driver is in the seat. Or that it is in the presence of an 802.11p device (of a car that belongs to the owner of the mobile device). Or it detects another IoT chip in the car with which it communicates using NFC (near field communications—such as that used in Apple Pay) or Bluetooth® (or any other communications technology which has limited distance and therefore the two devices have to be close to one another to detect one another.) This presence could be detected by observing the signal from the other device (i.e., the mobile phone could detect the signal transmitted by the IoT chip or the cellular chip in the car or the 802.11p chip in the car). This observation will typically involve receiving the signal and may also involve interpreting the signal to determine where it is from. Alternatively, it could be determined just be detecting a certain power level in a certain frequency band. The indication of presence could also go in the other direction, i.e., the car could detect the presence of the mobile device (this has the benefit that it only occurs when the car is on). In this case, the car IoT chip, or cellular chip or 802.11p chip detects that the mobile phone is present. With this "radio detection" (i.e., detection of radio waves) the system can determine that the mobile device is in or close to the car. The mobile device or device within the car (or any third party device) could also detect types of wireless signals to determine that the mobile device is in a car. For example, LTE uses multicarrier communications, which have certain spectral properties and peak-to-average properties that can be detected and used to determine that an LTE signal is nearby. Similarly, Safety Wi-Fi links use specific communications protocols and modulations that be detected. If both LTE and Safety Wi-Fi are detected simultaneously, this could determine that a phone and Safety Wi-Fi link are near one another.
- Identifying the owner of the device. Cell phones are registered with phone companies and the owner must provide information about his/her identity when purchasing the phone. Therefore each phone is associated with a person. This is a known characteristic which could be combined with, for example, knowledge that a certain car is owned by the same person. In the event that the car and the phone are in the same location (determined, e.g., by GPS in each device—i.e., the car and the phone) then it is assumed that the owner of both is with his phone and driving his car. This could also be determined by detecting the presence of the cell phone signal by the car or of the car by the cell phone.

Combinations of two or more of the above are also considered A properties. It may be useful to combine one or more of the above in order to determine that the mobile device is in the hands of a driver. For example:

- the mobile device is moving and the device is detecting a Wi-Fi Safety link signal from a vehicle owned by the owner of the mobile device.
- The mobile device is close to a known location in the vehicle and the mobile device detects a Safety Wi-Fi signal from the vehicle owned by the owner of the mobile device (note that the Safety Wi-Fi link is only ON when the vehicle is running).

An "A event" occurs when we determine that the mobile device is in the hands of a driver. This determination can be done by the mobile device itself, or by a third party device, such as by a device in a car. This information can then be stored within the mobile device or third party device. For example, an app could collect data within the phone of all the possible scenarios that would trigger an event A having occurred and note that this has happened. This app can be referred to as the ABD app—and more specifically an "event A flag" in the app. Alternatively, an app or software program within a third party device (such as a chip in the Safety Wi-Fi communications link in a car) could determine that a mobile device is in the hands of a driver in the car and store and log (or store) that an "A event" has occurred. This app (or software) can be referred to as the ABC app and event A would be logged therein.

Discussion of the ABD app and ABC app are further discussed below.

Exemplary "B communications", i.e., communications that should be disabled if an event A occurs;

- Texting, either sending or receiving
- Typing in internet addresses in a browser
- Writing or reading emails Posting to social network sites such as Facebook or LinkedIn.
Looking at Facebook®
Sending a Twitter® message
Receiving a tweet from Twitter®
Typing an address in a GPS app
Using the keypad of the phone in any way
Connecting the phone to a Wi-Fi hotspot in the car These are functions that are typically controlled entirely by the user and cannot be automatically turned off in the event that an event A is detected. One of the reasons for this is that a user owns their phone and pays for plans to use them for talking and texting. The service provider cannot disable this service without a user's consent. For this reason, one needs to actively disable texting (or any similar communications) by the user's own choice. Alternatively, there could be a software program that the user would authorize that would disable B communications when an A event is detected by the mobile device. Again, this is up to the user, since they would have to enable and allow the function to be performed by the app.

For step B, the ABD or ABC app could collect data within the mobile device or from the mobile device that the user has disabled texting, or exited Facebook®, etc. or disabled the keyboard, or disabled Wi-Fi and store that within the app. This could be referred to as an "event B confirmed" within the ABC or ABD app. When event B is confirmed it means that B communications are disabled. IF event B is not confirmed (which could also mean that no information is provided about B communications) then B communications are not disabled.

Exemplary "C functions" which are examples of communications and control functionality that are initiated by the car, include:
Use of the car's safety Wi-Fi link. i.e., if B communications are not confirmed OFF, then the Wi-Fi safety link is not enabled and the car warns the driver that car safety Wi-Fi link is not on because B communications are not disabled. (this could also allow insurers to determine that texting had not been disabled and therefore liability for accidents could be influenced).
Allowing other users in the car to use the car's cellular connection as a HotSpot.
Starting a car (by communicating from the mobile device to the car via dedicated signal or via a network connection using a text or an app, etc.)
Allowing the user to connect to Applecar® or android car (i.e. functionality that is in the car entertainment and control systems that are controlled by the user).
Allowing the car engine to remain running
Opening doors, trunk
Turning on lights
Opening sunroof
Using the mobile device to control the radio or audio in the car
Allowing the mobile device to connect via Bluetooth to the car's Bluetooth
Any action where some function associated with the car is controlled by the phone.

Exemplary "D function" uses of the mobile device as a controlling device:
Using the mobile device to control home automation
Using the mobile device to measure exercise and fitness information
Any use of the mobile device to control a third party device Establishing that a B event has occurred is an important aspect of one exemplary embodiment. This involves establishing the means by which it is confirmed that B communications have been disabled. This information is important to the mobile device itself in the event that the ABD app is being run, since for D functions to be allowed, B communications must be confirmed to be disabled. It is also important for the ABC app, since for C functions to be allowed, the car must determine that B communications have been disabled.

For the situation where D functions (i.e. subsequent functions to be performed by the mobile device itself) requires confirmation that B communications are disabled, then the mobile device can store a "B communications disabled" message in a way that it can be confirmed by the D functions. This confirmation could be achieved by any form of internal communication within the mobile device, or by using common or known storage locations within the mobile device that the B status information can be stored in and the D function can access to determine the B status.

For the situation where a C function (something to be performed by the car—or in general by any third party device) requires confirmation that B communications are disabled, the simplest means is for the device in the car (i.e. the device that is going to be used for the C function) to send a text to the mobile device requesting B communication status. The mobile device then responds with a B communications status message (e.g., with a confirmation message or an automated reply message) with a message that states that that texting has been disabled. This reply message serves as confirmation that the B communications are disabled. This could for certain C functions be done periodically (every 10 minutes, e.g., to discourage turning texting off and then on again). Each device that is to be used to provide C communications would first establish that B Communications have been disabled this way. Other ways that confirmation that B communications have been disabled include:
A handshake takes place between the mobile phone and the device whereby the device (e.g. the car's cellular chip or the car's Safety Wi-Fi link) initiates a message (e.g., a text) and waits for a reply from the cellular device that states that the cellular device has disabled texting. Texts can be sent over cellular networks or over Wi-Fi links, so this handshake can take place e.g. (i) with a cellular link between the car cellular chip and the mobile phone and text messages or (ii) with a Wi-Fi link between the Safety Wi-Fi chip and the mobile phone using texting over Wi-Fi messages.

If confirmation that B communications have been disabled is not made, then the C functions are not enabled. In addition to not enabling C functions, other activities or functions can be enabled as well. For example, if the Safety Wi-Fi Link tries to handshake with the mobile device and does not receive a confirmation that texting is disabled, it can indicate to the driver that it will not enable safety modes available via the Safety Wi-Fi link until texting is disabled, or it could sound an alarm (similar to the sound when seatbelts are not engaged) until texting is disabled. Similarly this could happen if the Car's cellular link does not receive a satisfactory response. In addition to disabling any C functions that are within the car's cellular chip control (e.g. Wi-Fi hotspotting for car occupants) it could send a message to the car to engage an alarm until texting is disabled. In all of the previous comments, the example was described for disabling texting, but the same would hold true for any B communications (such as tweeting, facebook posts, etc.).

One of the key elements of an exemplary aspect is that the information in A and B are stored so that past behavior is used to determine whether C functions or D functions will be allowed. In other words if A is determined, this information is stored in the phone or is stored in the third party device that determined A. If B has not been disabled, this too is stored in the phone or in the third party device (once learned from the phone). This information can then be used later to determine whether C or D functions will be allowed. For example:

1) An event A is determined by detecting that a cellphone is in close proximity to a Safety Wi-Fi Link of a car owned by the owner of the mobile phone (shown as 101 in FIG. 1)
2) Phone may also determine that "event A has occurred" through any of the means described above. In this case, it may provide this information to the car, through link 102 shown in FIG. 1.
3) Car notes that "event A has occurred".
4) If B communications are disabled, a message that "texting has been disabled" is also stored in the phone.
5) Car's cellular link is asked to provide a hotspot to car occupants. Car notes that event A has occurred and Car's cellular chip handshakes with Phone (shown as link 103 in FIG. 1). This exchange can be via text message back or by accessing a message stored in the phone that "texting has been disabled" or by any other means that the car and the phone can exchange this information.
6) Link 104 in FIG. 1 shows the status of B communications being transmitted from the mobile device to the car.
7) The car only allows C functions to operate, such as access for hotspotting to other phones in the car, or safety features such as autodriver or other car-to-car communications, if B communications have been disabled. If no B message is found or received to confirm that texting is disabled, messages are sent to occupants that B communications have not been disabled and C functions such as Hotspotting is not available because texting has not been disabled on the driver's phone and/or an audible alarm goes off in the car.

An app that detects that an event A has occurred and stores the confirmation that B has been disabled could be a source of information for C functions.

Figure 2:
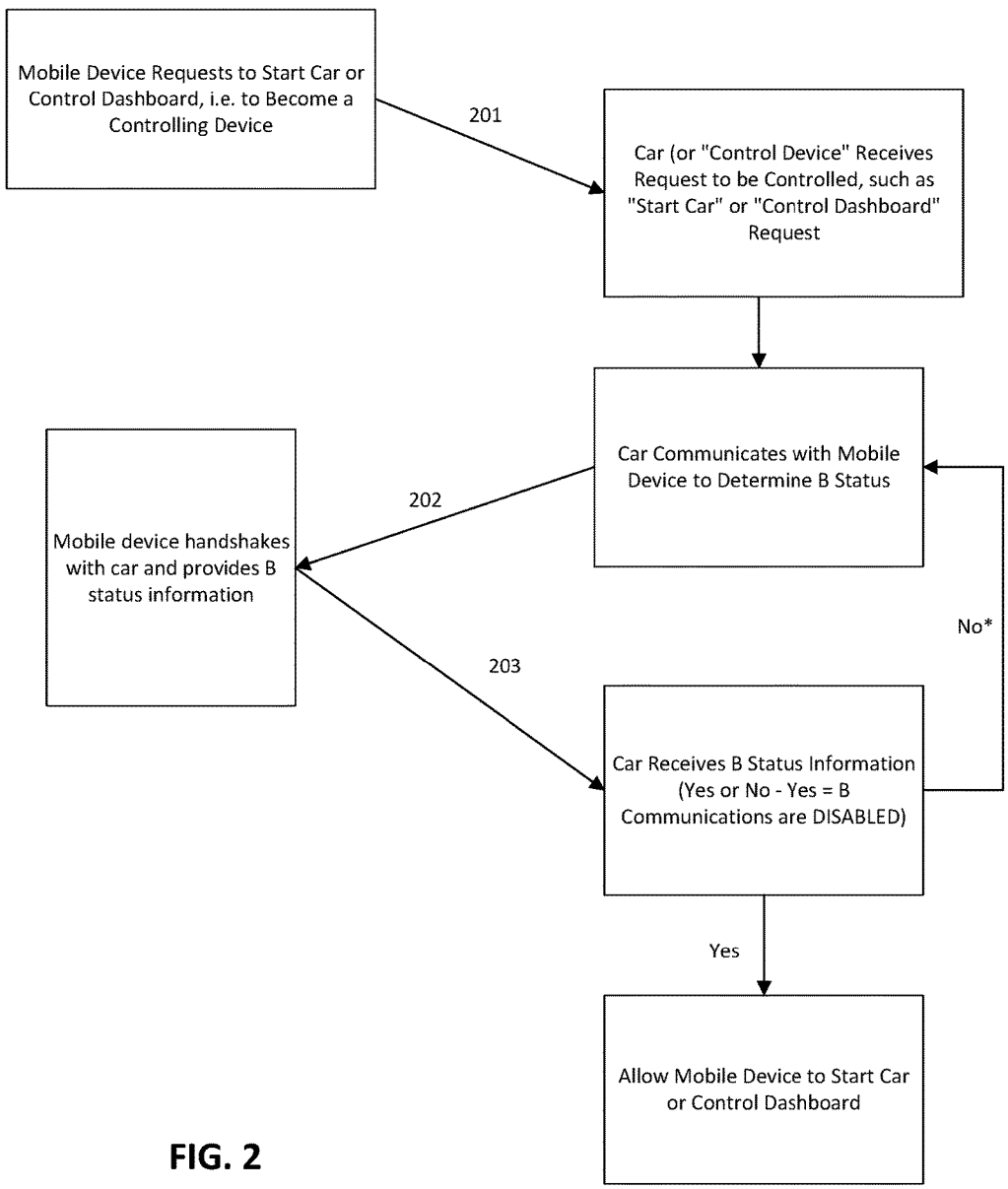
FIG. 2 is an example of a control device requiring confirmation of a certain condition prior to granting control to a controlling device.
Figure 4:
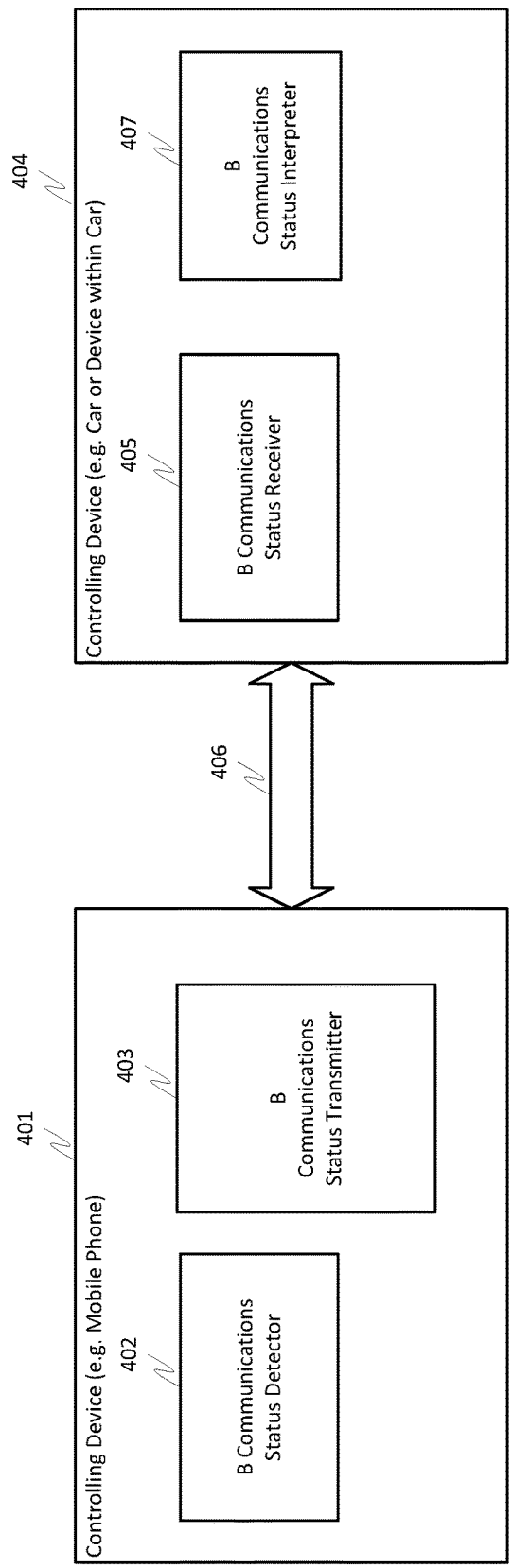
FIG. 4 shows the functionality that supports determining and exchanging information regarding the status of "B communications"

Another example of a series of steps (an ABC app example):

1) A mobile phone can be used a key for a car—the car e.g. can be started by sending a text to the car's cellular chip.
2) Car is requested to start by sending a text (201 in FIG. 2).
3) Since the mobile device was used to request to start the car, therefore the car automatically knows that the mobile device is going to be in the car. The car therefore knows to request whether B communications have been disabled. The Car cell chip (one of many exemplary means for the car and mobile device to communicate) sends a request for B status from car (this could be via text or via any other communications link) as shown in 202 of FIG. 1. If it does not receive a confirmation text back that texting is disabled, then it turns off the car.
4) Alternatively (not shown in FIG. 1) Event A could be detected (i.e. the mobile phone is in the car) by the car. This could be done because the phone touches a seat (and the seat and the phone both have NFC or the steering wheel and the phone both have NFC or a location close to the ignition switch and the phone both have NFC) or because the phone detects the Safety Wi-Fi link from the car or in a number of other ways that determine that the phone is in the car.
5) Mobile Device responds with B status as shown in 203 of FIG. 1.
6) This repeats until texting is turned off, otherwise car will not start or dashboard control will not be granted. Dashboard control would include allowing a Bluetooth link between the phone and car in order to listen to music. In this case, the phone tries to connect (link) to the car via Bluetooth (for either phone operation or listening to music), the car responds to this request by requesting from the mobile device the status of its B communications (as depicted in FIG. 4). Unless the car receives a confirmation that B communications have been disabled, it does not allow the phone to Bluetooth link to the car.

Another example of a series of steps (an ABD app example):

1) Mobile device detects that a signal originating from a car is present. This is determined by one of more of (i) detecting a specific type of radio wave signal, e.g. an 802.11p or LTE direct signal or cellular signal that is generated by the car (and only when the car is on) and (ii) recognizing that the specific radio signal is from the car that is owned by (or desired to be driven by) the mobile device owner (we call this "pairing" the mobile device to the car).
2) Mobile device instructs user to disable texting.
3) User disables texting and mobile device stores/logs that texting has been disabled
4) If user does not disable texting, when subsequent functions to be performed by the mobile device ("D functions" described above) are not allowed.

Regarding how the car and the mobile phone can be paired—this can be accomplished by determining that e.g., the VIN number (or some other identifying serial number) of the car is the same as the VIN number (or other identifying serial number) of the owner of the mobile device. If, e.g., the mobile device has a app that is used to control the car, this app can contain the serial number and therefor the phone knows what the serial number is. When it receives a signal from the car it compares the serial number in the message (we assume that there is an overhead message that identifies the car at some point in the communications protocol) with the one it knows to be its own and pairs if they match.

Figure 3:
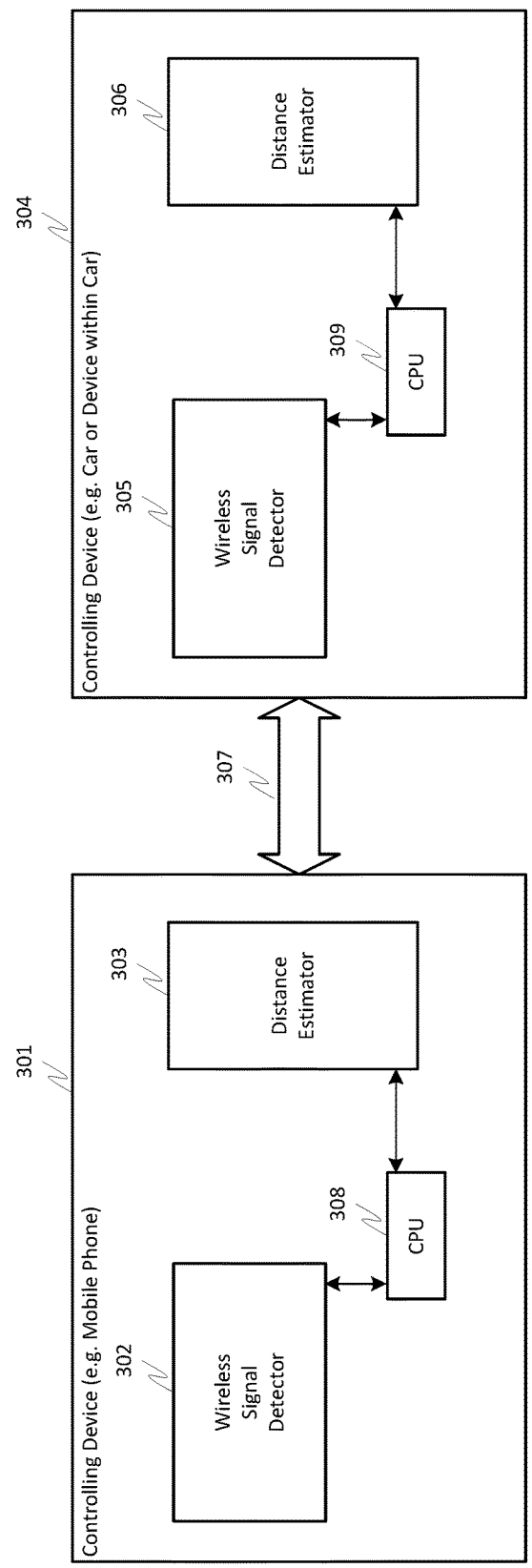
FIG. 3 is a depiction of the functionality that supports determining that an "A event" has occurred.

FIG. 3 shows the improvements to a Mobile phone and a car/vehicle (examples of a controlling device and a control device, respectively) that are used to determine that an "A event" has occurred. In this Figure, 301 is a controlling device (such as a mobile phone) and 304 is control device (such as a car). Within each of these devices, there are the following modules (implemented in software, hardware or a combination of both):

a. a wireless signal detector, shown as 302 within the mobile device and 305 within the car. A wireless signal detector is used to detect a specific wireless signal, such as an 802.11p signal or a cellular LTE signal, or the like. Detection is accomplished by receiving and decoding the wireless signal, or by detecting a signal with a specific carrier frequency and spectral or peak to average properties.

b. A distance estimator, shown as 303 within the mobile device and 306 within the car. Distance estimator 303 can determine the distance between the mobile phone and a known location by comparing its GPS location to that of the GPS location of the known location. Alternatively, the distance estimator can measure the strength of a known wireless signal (e.g., a signal that is known to have been transmitted at a certain power level from a known location—such as the Safety Wi-Fi link signal in a car) and from the strength of the signal, determine the distance from the transmitter.

Also shown in FIG. 3 is a communications link 307 between the controlling device and the control device. This can be any wireless communications link, including Bluetooth®, NFC, cellular, Wi-Fi or other communications. This link is used to exchange information between the mobile phone and the car, including wireless signal detector information and distance estimator information. CPUs 308 and 309 are central processing units within the mobile device and the car. Within the mobile device, CPU 308 communicates with the 302 and 303 blocks and can be used for storing, recalling and processing the information determined in blocks 302 or 303. Within the car, CPU 309 communicates with the 305 and 306 blocks and can be used for storing, recalling and processing the information determined in blocks 305 or 306.

In FIG. 4, 401 depicts the controlling device and 404 depicts the control device. Communications link 406 is any wireless communications link including Bluetooth, cellular or Wi-Fi communications, NFC or other PAN communications. Within the mobile device, module 402 determines the status of B communications. This is determined by observing a status register in the phone, or by detecting a flag or indicator within memory that states that the B communications are disabled. The mobile phone also includes B communications status transmitter 403 that transmits information regarding the B status either in response to a request or periodically as a broadcast beacon. Within the control device, B status receiver 405 is used to receive the information transmitted from the mobile device regarding the status of B communications within the mobile device. This information is exchanged over communications link 406 and typically involves a handshake mechanism whereby 404 requests that 401 provide its B status information, 403 transmits the information (which it knows by observing 402) to receiver 405, which determines the information in the Interpreter in 407. 407 will also determine what to do if no signal is received by 405 in response to the request for a signal. Not depicted in FIG. 4 are CPU modules similar to those shown in FIG. 3. The CPU module connects to the Status Detector and Transmitter within the mobile device and the CPU module in the car connects to the Status receiver and Interpreter. Information to and from blocks 402 and 403 go through a CPU in the mobile device. Information to and from blocks 405 and 407 go through a CPU in the car.

Communication Link Options Between the Mobile Device and the Car

A communications link between the mobile device and the car can be a cellular (such as the Global System for Mobile Communications—GSM) or other wireless network offered by a service provider. It can also be a local area network (LAN) such as Wi-Fi (including any of the versions of 802.11, e.g. 802.11p, 802.11g, 802.11n, 802.11ah, etc.) or personal area network (PAN) using a communications technology such as Bluetooth or Near Field Communications (NFC), Wireless USB, Zigbee, Z-Wave or the like. It can also be radio frequency communication (RFID) link at any of the frequencies that RFID links use. It can also be any combination of the above, e.g. RFID and NFC or any other combination. The communications links are depicted as 307 in FIGS. 3 and 406 in FIG. 4. The purpose of this communications link is for the mobile device to be able to communicate with the car (or any control device within the car) and each to be able to send and receive commands to/from one another. In addition to establishing communications between the mobile device and the car (or control device within the car) the two devices can also each be connected to the Internet. This connection to the Internet can either be accomplished through the cellular signal (using e.g. a cellular data connectivity solution) or through a LAN (such as Wi-Fi) that is connected to the Internet. By connecting to the Internet, each of many control devices can be communicated with by the mobile device that is also connected to the Internet. It is therefore possible for the control device and the mobile device to communicate with one another directly through a cellular or other wireless connection, or via a common Internet connection either through the cellular or other wireless communication or through Wi-Fi, Bluetooth or other LAN or PAN communications. The mobile device and the control device may communicate with one another via text messages or other textual communications or through communications initiated by voice controlled applications such as Siri or by any app on a phone.

The car (or any control device within the car) must be able to send and receive commands from the mobile device over the communications link and be able to respond to the commands and send information about its status to the mobile device. For example, a car has to be able to receive the command "start the car" or that a key is present and cause the car to start. The car also has to be able to notify the control device when it is shut off so that the control device can send a command that says "car is off" to the mobile device. Today, many vehicles are able to start without inserting a key into an ignition switch. The vehicle is able to detect the presence of the "key" and allow the car to start by pushing a button on the car (typically using RFID), turning an ignition switch or pushing the brake (as in the case of a Tesla® electric car). If the key were not present, no signal would be detected by the car and pushing the button or brake, or turning the ignition switch would not start the vehicle. The switch or button only turns the vehicle "on" if it detects that the key is present. In electric vehicles, the presence of the key allows the electric motor that propels the car to operate. If the key is not present, the electric motor does not operate even when the accelerator pedal is depressed.

In an exemplary embodiment, the mobile device includes a computer program designed to run on mobile devices known as an App, which will be referred to as SafeText or SecureText and which has four exemplary purposes:

The first purpose of the App is to establish that the mobile device is in the position of someone who is in the driver's seat. We described this above as determining that an "A event" has occurred. We also describe a number of ways in which this can be determined.

Second when installed and when open, it determines that a "B communications" has been disabled by the user of the mobile device.

Third, the App provides the information about B communications to (i) other apps or programs or functionality within the phone and (ii) to devices outside the phone that request such information. I.e. it provides information that are to be used by C functions and D functions (as described above).

The fourth purpose of the App is to allow other functionality to decide not to engage (or not to be enabled) unless B communications have been confirmed to be disabled. This "other functionality" as described previously could be communications initiated by the car (or other device), i.e. C functions, or functionality performed by the mobile device itself, e.g. D functions.

In order to prohibit the use of texting (or other communications) the App confirms that the mobile device is in the Driver's possession, and that text/voice communications are disabled before it sends the command to start the car to the car. Alternatively, if it is determined that the mobile device is in the Driver's possession, then it allows the message to be sent to start the car and then disables the communications ability of the phone.

As long as the car is running, the mobile phone is in what is called "Car Mode" and is unable to send or receive texts—or alternatively it receives the texts but does not notify the owner of the phone of them until the App allows this to happen which can only occur after the car has informed the mobile device that it is off and Car Mode has been turned off.

Once the car is turned off, the control device in the car sends a signal over e.g. the PAN link that it is off. This signal is received by the mobile phone and the App recognizes it, turns off/disables Car Mode and restores the ability to send/receive texts. At this time, the App also presents the mobile phone user with any texts or calls that may have been received while in Car Mode. Alternatively, the user of the mobile device can disable Car Mode by himself, at which point the app will change the "B communications" status from "disabled" to "not disabled" (i.e. from the status that texting, etc., was disabled to the status that texting etc. is no longer disabled). Any subsequent communications involving the phone that request or require that B communications be disabled will receive the "not disabled" message.

While the above embodiment described a communication link using Bluetooth between the mobile device and the car, any communications link such as RFID, cellular, Wi-Fi, any LAN or PAN some other proprietary technology that allows communications between devices can be used.

Figure 5:
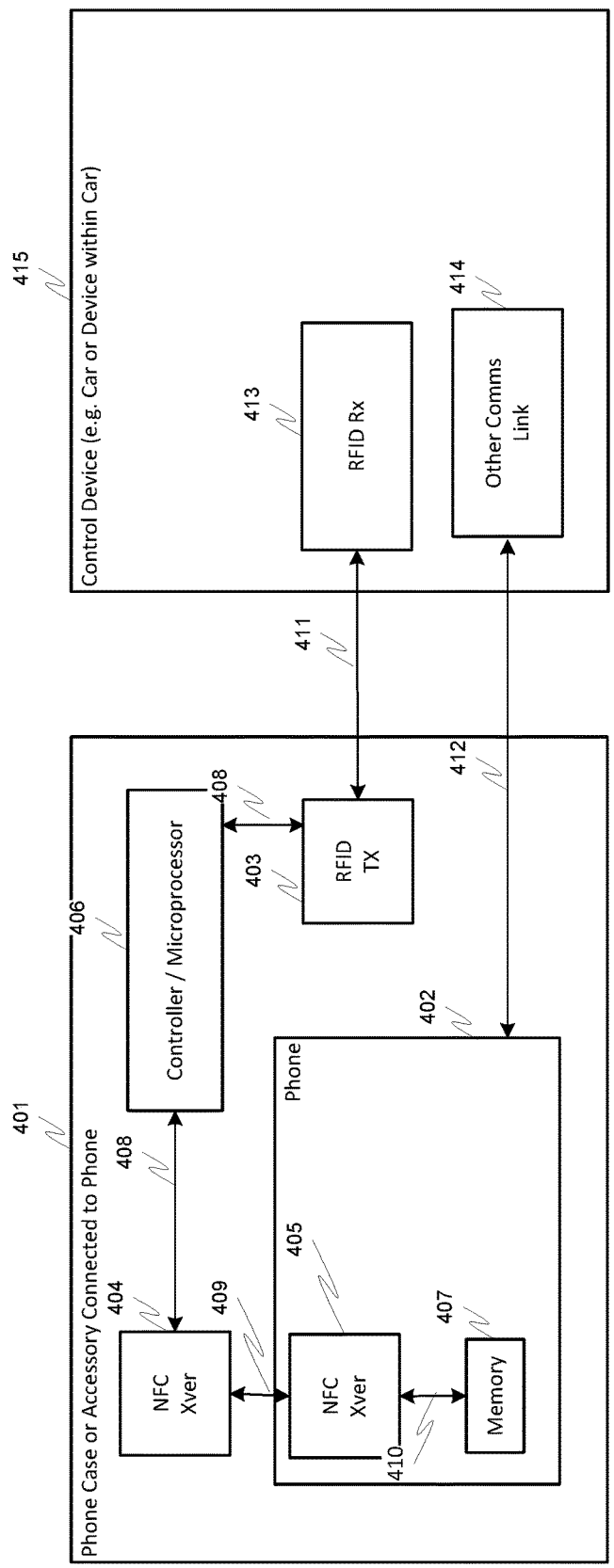
FIG. 5. show the improvements enabled by the techniques disclosed herein for use of a phone in conjunction with remote operations of a car.

Another embodiment of the operation can be realized when the car has a wireless key capability (i.e. a key that must be present for the car to start—either by pushing a button in the car, or by turning a keyless ignition switch) but is not equipped with the ability to send or receive messages directly from a mobile device. In this case, the App described above can operate with the wireless key and only allow the wireless key to function if the mobile device has disabled text/voice communications and the mobile device is determined to be in the Driver's possession. One way this can be realized is with a phone case into which the wireless key can be installed or to which the wireless key can be added. The phone case also contains the Driver's mobile device so that the wireless key and mobile device are co-located in the phone case. More specifically, this is depicted in FIG. 5. In order to open a car or allow an ignition button to engage and RFID signal is sent from a RFID Tx 403 embedded within case 401 or in an accessory 401 attached to a mobile device 402. The RFID links sends an identifying code, i.e. a code that is unique to the mobile device or the car or identifies the mobile device to the car. Before the RFID signal is enabled to be sent by controller 406, controller 406 confirms with NFC transceiver 404 which is also embedded in case 401 that 404 has received a signal from NFC transceiver 405 (within mobile device 402) indicating that text messaging is disabled in mobile phone 402. This information is obtained by transceiver 405 by accessing a memory location 407 also within phone 402 which indicates the status of texting and of "B communications" as described above in general. Controller/microprocessor 406 communicates with both RFID transmitter 403 and NFC transceiver 404 via wired interfaces within the case. These are depicted as two way arrows as 408 in FIG. 5. Link 409 between the NFC transceiver in the case and the NFC transceiver in the phone is a wireless link typically at higher frequencies and with less reach capabilities than link 413 used for RFID. Link 410 between the NFC transceiver in the phone and the memory is wired or accessed via a software memory look up. The memory location 407 contains a B communications disabled message only in the event that texting (or other B communications) have been disabled. This is accessed by NFC transceiver 405 and communicated to NFC transceiver 404. The controller 406 within the case registers this message and then enables transmission of the RFID code by RFID transmitter 403. The RFID signal sent from 403 is received by RFID receiver 413 within a car or within a device in a car. Upon receipt of this message, control device/car 415 enables certain functions, such as opening the doors or allowing the car to be started with the ignition. If the RFID message is not received by receiver 413, these functions are not enabled. This forces the phone user to disable texting in order to use the remote entry or remote start capabilities in the car. The 411 communications link between the RFID transmitter 403 and RFID receiver 413 is a wireless link at frequencies typically used by RFID (in the KHz and MHz ranges). Other communications links also exist between transceivers in the control device 415 and transceivers in the phone 402. These are depicted as 412 and are wireless links that connect for example cellular transceivers, or Wi-Fi transceivers or NFC transceivers. Note that the description above can also be extended to the case where the RFID transmitter is in the car and the RFID receiver is in the case. In this case, the controller enables the RFID receiver in the case to receive only if a texting disabled message is communicated from the phone to the case through the 409 NFC link.

Important Modes of Operation of Car Mode

Receive but not Display Texts or Calls

In one embodiment, an exemplary operation is for the mobile phone to receive any text or call while in Car Mode but to not notify the user until the mobile device is out of Car Mode (which can only happen if the car has notified the phone that it is OFF). These messages or phone calls are thus stored in the phone but no signal notifying their existence or other indication is provided to the user until Car Mode is Off. While in Car Mode, no text can be sent by the user. Any attempt to access the text message App is disabled through any of a number of means including, not allowing the message app to open, not allowing the keyboard to type, not allowing Siri (or any other voice activated technology) access the messages App, etc. Texts coming in get put in a text bank and will be received by the user after car is off yes. If this happens, the phone sends an automatic message as mentioned earlier that says something along the lines of "im driving . . . won't receive this text till later . . . im not ignoring you.".

Allow Limited Access to Voice Calls

In another embodiment, the Car Mode App allows the phone to place or receive voice calls (but not texts) from a limited number of identified phone numbers. For example one could designate that voice call only from one's parent or emergency contact could be allowed. In this case a call only from that designated number would be indicated as incoming to the user and the user could answer the call. Also, in this case the user could place a call to such numbers even when in Car Mode. 911 (or other local emergency contact numbers) would be included in this list. This would mean that if there were an accident, for example, and for whatever reason the mobile phone cannot be instructed to exit Car Mode by the car, then a call could still be placed to 911. In a preferred embodiment, when in Car Mode, if the user opens tries to access text or voice calls the SafeText App opens and a screen showing the allowed numbers is displayed (e.g. parent, emergency contact, 911, etc). These numbers can only be used to place a voice call. Included in this would be the ability to add or delete people on the list dynamically—one day A, B, C, D and E are allowed to be called, and the next D is replaced with N.

Any Vehicle

While this has been described with a car in mind, any vehicle can be assumed including boats, trucks, trains, airplanes, recreational vehicles, etc., the first target audience was public transportation such as buses and taxis. Public transportation such as buses, trains and taxis are examples of vehicles for which the App and control device would provide the benefit of public safety. This could be advertised on the bus as a safety feature as in "we use SafeText so our bus drivers don't even have phone access." Another likely use of the App is for parents to require their teenage and unexperienced children drivers to use the App, again as a matter of public safety but also for their own safety.

Determining that the Driver has Possession of the Mobile Device

One of the optional elements of this invention is that a determination must be made that the mobile device is in the Driver's possession. In a preferred embodiment, the signal strength of a known signal (e.g., Bluetooth®) that was sent from the vehicle is measured at the mobile device. As long as the strength of the signal is above a certain value, it is determined the mobile device is in a location consistent with that of a driver. In another embodiment, the distance between the mobile device and a known location in the car (the Point) is determined by GPS or other position location technology. In another embodiment, a signal is transmitted from the mobile device towards the Point and the echo from the transmission is used to determine the distance to the Point. After Car Mode is on, the mobile device remains in Car Mode until the car notifies that it is Off. The mobile device does not need to be in the location of the Driver for this signal to be received. In no instance can Car Mode be disabled if the vehicle is in motion. In another example, an RFID signal is transmitted by the phone (or by a case containing the phone) that can only be received when the phone or case are close to the RFID receiver in the car.

Other Devices in the Vehicle

The Device in the possession of the Driver must be in Car Mode while driving, but other mobile devices in the vehicle have no limitations on their abilities to send or receive texts or voice calls. This way, passengers in the car can still use their mobile devices.

Messages Received while in Car Mode

Text or voice messages received while in Car Mode are displayed to the mobile device user only after the mobile device has exited Car Mode (except for voice calls from designated numbers as described above). Messages sent to the Driver's mobile device will be responded to automatically by the mobile device with a message saying that the user is driving and will receive the text later when no longer driving. Voice calls will automatically go to a voice message that says that the user is driving and will receive notice of the call when no longer driving.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, IEEE 802.11p, WiFi, LTE, LTE direct, 4G, Bluetooth®, WirelessHD, WiGig, WiGi, 3GPP, Wireless LAN, WiMAX, RFID and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for improving safety. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system for communicating between a mobile device and a controlling device comprising:
    a first transceiver, comprising a first transmitter and a first receiver, in the controlling device capable of sending an identifying code or receiving an identifying code;
    a second receiver in the controlling device capable of receiving a message indicating that texting is disabled in a mobile device from a second transmitter in the mobile device; and
    a controller, connected to the first transceiver, that enables the first transceiver to send or receive the identifying code;
    wherein said controller enables the first transceiver upon receipt of said message by the second receiver; and
    wherein the first transceiver and the second receiver use different frequency bands and the second receiver and second transmitter use the same frequency bands.

2. The system of claim 1, wherein the first transceiver uses a wireless protocol.

3. The system of claim 1, wherein the second transmitter and second receiver use a wired link or a wireless protocol.

4. The system of claim 1, wherein the identifying code is unique to one of: the mobile device or the controlling device.

5. The system of claim 1, wherein texting includes any communications that require active participation by the user of the mobile device.

6. The system of claim 1, wherein the controlling device is a key that controls an electronic device or a vehicle.

7. The system of claim 6, wherein the key is embedded in a phone case connected to the mobile device.

8. The system of claim 1, wherein the controlling device is a module in an electronic device that controls a vehicle.

9. The system of claim 1, wherein the receipt of the message is confirmed by the controller by accessing a memory location.

10. The system of claim 1, wherein the mobile device operates an app that enables a user of the mobile device to request that the second transmitter transmit a message to the second receiver indicating the status of texting in the mobile device.

11. The system of claim 10, wherein the status of texting is determined by observing a memory location in the mobile device.

12. The system of claim 1, wherein the controller comprises one or more hardware components.

13. A system of communications between a mobile device and a controlling device comprising:
    a first transmitter in the mobile device capable of sending a message to a first receiver in the controlling device that indicates whether texting is enabled or disabled in the mobile device;
    a second transmitter in the controlling device capable of connecting to the Internet; and a CPU in the controlling device connected to the second transmitter, that enables communications by the second transmitter only when the message received by the first receiver indicates that texting in the mobile device is disabled;

wherein the first and second transmitters use different frequency bands and the first transmitter and first receiver use the same frequency bands.

14. The system of claim 13, where the second transmitter is capable of connecting to the Internet using a WiFi protocol or cellular protocol.

15. The system of claim 13, wherein the controlling device is a vehicle or a module, comprising hardware and software, in a vehicle.

16. The system of claim 13, wherein texting includes any communications that require active participation by the user of the mobile device.

17. The system of claim 13, wherein the mobile device operates an app that enables a user of the mobile device to request that the first transmitter send a message indicating the status of texting in the mobile device.

18. The system of claim 13, wherein the indication that texting in the mobile device has been or has not been disabled is determined by the CPU by accessing a memory location.

19. The system of claim 18, wherein the CPU, based on the contents of the message received at the first receiver, is capable of further initiating an alarm notifying that texting has not been disabled.

20. The system of claim 13, wherein the CPU is a central processing unit capable of storing, recalling and processing information related to the controlling device.

* * * * *